Patented July 25, 1944

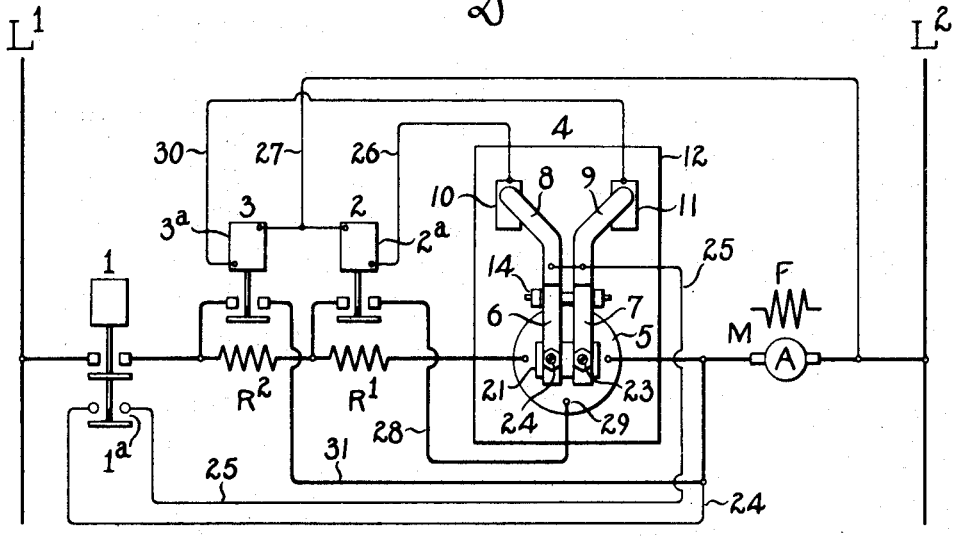
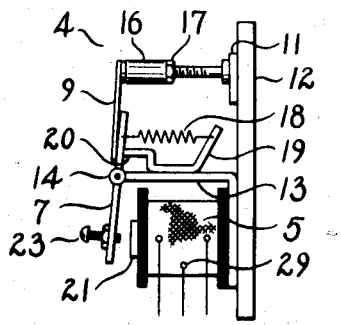
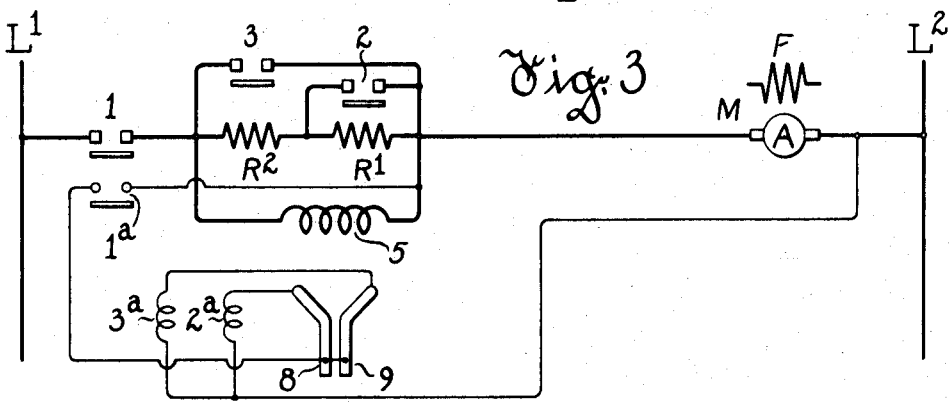

2,354,406

UNITED STATES PATENT OFFICE 2,354,406

CONTROLLER FOR ELECTRIC MOTORS

Edwin W. Seeger, Wauwatosa, Wis., assignor to to Cutler-Hammer, Inc., Milwaukee, Wis., a corporation of Delaware Application July 13, 1942, Serial No. 450,734

5 Claims. (Cl. 172—288)

This invention relates to improvements in controllers for electric motors.

While not limited thereto controllers embodying the invention are especially advantageous for the motors of aircraft turrets.

An object of the invention is to provide an improved controller of the current controlled so-called series relay type.

More specifically the invention has among its objects to provide a simplified but efficient and reliable controller.

Other objects and advantages of the invention will hereinafter appear.

The invention will now be described in connection with the accompanying drawing which illustrates certain embodiments thereof, it being understood that the embodiments illustrated are susceptible of various modifications without departing from the scope of the appended claims.

In the drawing,

Figure 1 is a showing mainly diagrammatic of one form of control;

Fig. 2 is a side elevational view of a relay employed in Fig. 1, and

Fig. 3 shows diagrammatically a modification of the controller of Figs. 1 and 2.

Referring to Fig. 1, it shows diagrammatically a motor M having an armature A and a field winding F, said motor to be supplied with power from lines $L^1$ and $L^2$. The motor may be of any preferred type and the field winding may be connected in circuit in any preferred manner. For simplicity of illustration the circuit connections for the field winding which may be assumed to be a shunt field winding are omitted.

The motor armature A is shown as adapted to be connected across lines $L^1$—$L^2$ through series connected resistors $R^1$ $R^2$ by a main switch 1 which in practice may be of any preferred type either manual or power operated. Switch 1 is shown as of the electromagnetic type, but for simplicity of illustration it is shown without control connections, such connections being well known.

The resistors $R^1$ and $R^2$ are shown as provided with short-circuiting switches 2 and 3, respectively. These accelerating switches are shown as of the normally open type respectively having electroresponsive windings $2^a$ and $3^a$ to effect closure thereof. As will be understood, it is desired to have switches 2 and 3 respond sequentially, each subject to control by the current condition of the motor armature circuit.

The means illustrated to control switches 2 and 3 comprises a relay 4 of a multi-switch type.

This relay described in a general way comprises an electromagnet 5 having two armatures 6 and 7 pivotally mounted side by side and having contact extensions 8 and 9, said armatures being biased normally to engage the contacts associated therewith. The electromagnet 5 is energizable to attract both armatures 6 and 7 substantially simultaneously to effect disengagement of the contacts associated with said armatures, whereas the armatures are releasable sequentially as the current supplied to the electromagnet decreases, thereby to effect sequential re-engagement of the sets of contacts associated with said armatures. One set of contacts when engaged completes an energizing circuit for the resistance switch 2, while the other set of contacts when engaged completes an energizing circuit for the resistance switch 3.

The relay 4 which in practice may assume various forms may be constructed as illustrated in further detail in Fig. 2. This form of relay has all parts thereof mounted on a panel 12, the electromagnet 5 having a magnetic frame 13 on which it is mounted with its axis perpendicular to the panel and said frame having disposed perpendicularly to the panel a leg carrying a pivot 14 for support of the armatures 6 and 7. Each of the terminal plates 10 and 11 of the relay is fixed to the panel and has projecting therefrom a threaded shank upon which is threaded for axial adjustment a cylindrical contact 16 to be locked in adjusted position by a lock nut 17. The contacts 16 of the two terminal plates are engageable by the contact extensions 8 and 9 of the armatures 6 and 7, respectively, each of said contact extensions preferably comprising a leaf spring with a suitable contact tip. The armatures 6 and 7 have individual biasing springs 18, that of armature 7 being shown in Fig. 2, each spring being connected at one end to its respective armature and at its other end to a bracket 19 fixed to the magnetic frame 13 and the bracket being formed to provide a stop 20 for each armature to limit the inward movement thereof under its spring bias. Thus both armatures are biased to engage their respective sets of contacts and whereas each armature has a stop its respective stationary contact is so adjusted that the spring extension of the armature is stressed for suitable contact pressure when the armature is against the stop. The electromagnet 5 has a pole face 21 extending transversely across the lower ends of the two armatures 6 and 7 and said armatures carry adjustable screws 23 and 24, respectively, for engagement with the pole face 21 to provide an adjustable air gap between each armature and the pole face when the former is attracted to the latter. As will be apparent, the individual adjustments for the armatures 6 and 7 enable said armatures to be adjusted for release sequentially and as a function of decrease in the magnetic flux of the electromagnet.

Considering now the circuits and functions of the controller of Fig. 1, closure of main switch 1 completes circuit from line L¹ to and through resistors R² and R¹ and the entire winding of electromagnet 5 all in series, and thence to and through the motor armature A to line L². Establishment of this circuit starts the motor, at the same time energizing electromagnet 5 to open both switches of relay 4, which switches for convenience will be referred to as 6 and 7, and so long as such relay switches remain open the motor connections remain unchanged. However, the motor inrush current drops as the armature speeds up, thus decreasing the current supplied to the electromagnet 5 and assuming adjustment of relay switch 6 to release prior to switch 7 decrease of the inrush current to a predetermined value will release switch 6 for reclosure thereof to complete the circuit of winding 2ª of accelerating switch 2. More specifically, closure of switch 6 connects the winding 2ª across the motor armature terminals, such connection extending from a point between the armature and the electromagnet 5 by conductor 24 to and through the auxiliary contacts 1ª of main switch 1, by conductor 25 to and through switch 6 of relay 4, by conductor 26 to and through the winding 2ª, by conductor 27 to the opposite side of the motor armature. Switch 2 upon responding short-circuits resistor R¹ together with a portion of the winding of electromagnet 5, the motor circuit now extending from a point between resistors R² and R¹, to and through switch 2, by conductor 28 to a tap 29 on the electromagnet 5. This, of course, tends to reduce the holding pull of electromagnet 5 on its armature 7 and such pull is further reduced with reduction of the motor inrush current as the motor accelerates following exclusion of resistor R¹. Consequently at some predetermined value of the motor current relay switch 7 will reclose to connect the winding 3ª of accelerating switch 3 across the motor armature. The circuit of winding 3ª is common to that of winding 2ª from the left hand side of the motor armature to the relay and then extends through switch 7 of relay 4 by conductor 30 to and through winding 3ª, by conductor 27 to the right hand side of the motor armature. Switch 3 in responding short-circuits resistor R² together with the entire winding of electromagnet 5, circuit then extending from main switch 1 to and through switch 3 by conductor 31 directly to the motor armature.

Here it is to be noted that the energizing circuits of both accelerating switches are dependent upon engagement of the auxiliary contacts of the main switch and are interrupted by said contacts when the main switch opens. Also it is to be noted that inasmuch as the windings of both accelerating switches when connected in circuit are in shunt with the motor armature, the relay 4 is afforded ample time to open both of its switches 6 and 7 while the motor is commencing to rotate, there being very little current shunted to the windings 2ª and 3ª pending partial acceleration of the motor.

Referring to Fig. 3, the same shows the same elements as are shown in Fig. 1, but with somewhat different circuit connections. In this instance the electromagnet 5 is shown merely diagrammatically as comprising a winding permanently connected in parallel with resistors R¹ and R², said winding having no intermediate tap. The accelerating switch 2 in closing short-circuits resistor R¹, thereby tending to accelerate the motor, at the same time changing the resistance value of the shunt around the electromagnet 5, and the accelerating switch 3 in closing short-circuits resistor R² and also the electromagnet 5. The remaining connections are the same as in Fig. 1, whereas the altered connections are so obvious as to render unnecessary more specific description thereof.

As will be apparent, the connections of Fig. 3 are such that the controller will function similarly to the controller shown in Fig. 1, the calibration of the relay being changed by response of accelerating switch 2 but in a different manner from that characterizing the controller of Fig. 1.

For aircraft service the relay 4 preferably has its levers balanced whereby said relay will function reliably in the different angular positions to which it is likely to be moved in such service.

What I claim as new and desire to secure by Letters Patent is:

1. In a controller for electric motors, in combination, electroresponsive accelerating switches, a relay having for control of said switches individually sets of normally engaged contacts under control of a common electromagnet for disengagement substantially simultaneously and for re-engagement sequentially as the magnetic pull of said electromagnet decreases, and circuit connections for said electromagnet whereby it is subjected to at least part of the current flow to the motor armature and prior to response of a certain accelerating switch is subjected to a change in calibration as a function of response of another accelerating switch.

2. In a controller for electric motors, in combination, electroresponsive accelerating switches, a relay having for control of said switches individually sets of normally engaged contacts under control of a common electromagnet for disengagement substantially simultaneously and for re-engagement sequentially as the magnetic pull of said electromagnet decreases, and circuit connections for said electromagnet whereby it is subjected to at least part of the current flow to the motor armature and prior to response of a certain accelerating switch is subjected to change in number of its active turns as a function of response of another accelerating switch.

3. In a controller for electric motors, in combination, electroresponsive accelerating switches, a relay having for control of said switches individually sets of normally engaged contacts under control of a common electromagnet for disengagement substantially simultaneously and for re-engagement sequentially as the magnetic pull of said electromagnet decreases, series resistance for the circuit of the motor armature controlled by said accelerating switches and circuit connections placing said electromagnet in parallel with said resistance whereby said electromagnet is subjected to part of the current flow to the motor armature and whereby as resistance is excluded from the motor armature circuit the resistance shunting said electromagnet is varied.

4. The combination with an electric motor, of electroresponsive accelerating switches therefor each dependent for energization upon completion of an individual circuit across the terminals of the motor armature and a relay having for control of said switches individually sets of normally engaged contacts under control of a common electromagnet for disengagement substantially simultaneously and for re-engagement sequentially as the magnetic pull of said electromagnet decreases, said electromagnet being subjected to at least part of the current flow to the motor armature.

5. The combination with an electric motor, of electroresponsive accelerating switches therefor each dependent for energization upon completion of an individual circuit across the terminals of the motor armature and a relay having for control of said switches individually sets of normally engaged contacts under control of a common electromagnet for disengagement substantially simultaneously and for re-engagement sequentially as the magnetic pull of said electromagnet decreases, said electromagnet being subjected to at least part of the current flow to the motor armature and being also subjected, prior to response of certain of said accelerating switches, to a change in calibration as a function of response of another accelerating switch.

EDWIN W. SEEGER.